United States Patent [19]

Roberts

[11] Patent Number: 4,827,654
[45] Date of Patent: May 9, 1989

[54] FISHING ROD HOLDER FOR CASTING AND SPINNING REELS

[76] Inventor: Joseph M. Roberts, 1112 Otis Dr., Alameda, Calif. 94501

[21] Appl. No.: 144,553

[22] Filed: Jan. 13, 1988

[51] Int. Cl.⁴ .............................................. A01K 97/10
[52] U.S. Cl. ...................................... 43/21.2; 248/514
[58] Field of Search ............................ 43/21.2, 17, 22; 248/514, 520, 521

[56] References Cited

U.S. PATENT DOCUMENTS

| | | | |
|---|---|---|---|
| 977,835 | 12/1910 | Pislator | 43/21.2 |
| 2,481,272 | 9/1949 | Williams | 248/514 |
| 2,621,877 | 12/1952 | Grigsby | 43/21.2 |
| 2,630,993 | 3/1953 | Cagnoli | 43/21.2 |
| 3,570,793 | 3/1971 | Shackel | 43/21.2 |
| 4,198,775 | 4/1980 | Leisner | 43/21.2 |
| 4,676,019 | 6/1987 | Engles | 43/21.2 |

FOREIGN PATENT DOCUMENTS 2371142  7/1978  France ............................ 43/21.2

Primary Examiner—Nicholas P. Godici
Assistant Examiner—Karen Skillman
Attorney, Agent, or Firm—Flehr, Hohbach, Test, Albritton & Herbert

[57] ABSTRACT

A fishing rod holder for casting and spinning reels includes a holster portion for receiving a rod with a rigid clamp rotatably mounted on one end of the holster portion for retaining a reel within the holster portion. The rigid clamp includes an integral appendage which locks into said holster portion a spinning reel depending from a rod outside of the holster. The fishing rod holder further includes a support post rotatably attached to the holster portion and a mount which is attachable to a base structure, the mount including a barrel portion for receiving the support post. Shoulders on the post and on the holster portion limit the forward pivot of the holster. The support post includes a protrusion on one end with the barrel including a groove in its inner surface for receiving the protrusion, whereby the post can be partially inserted into and rotated within the barrel with the protrusion preventing removal of the post from the barrel unless the protrusion is aligned with the groove.

7 Claims, 3 Drawing Sheets

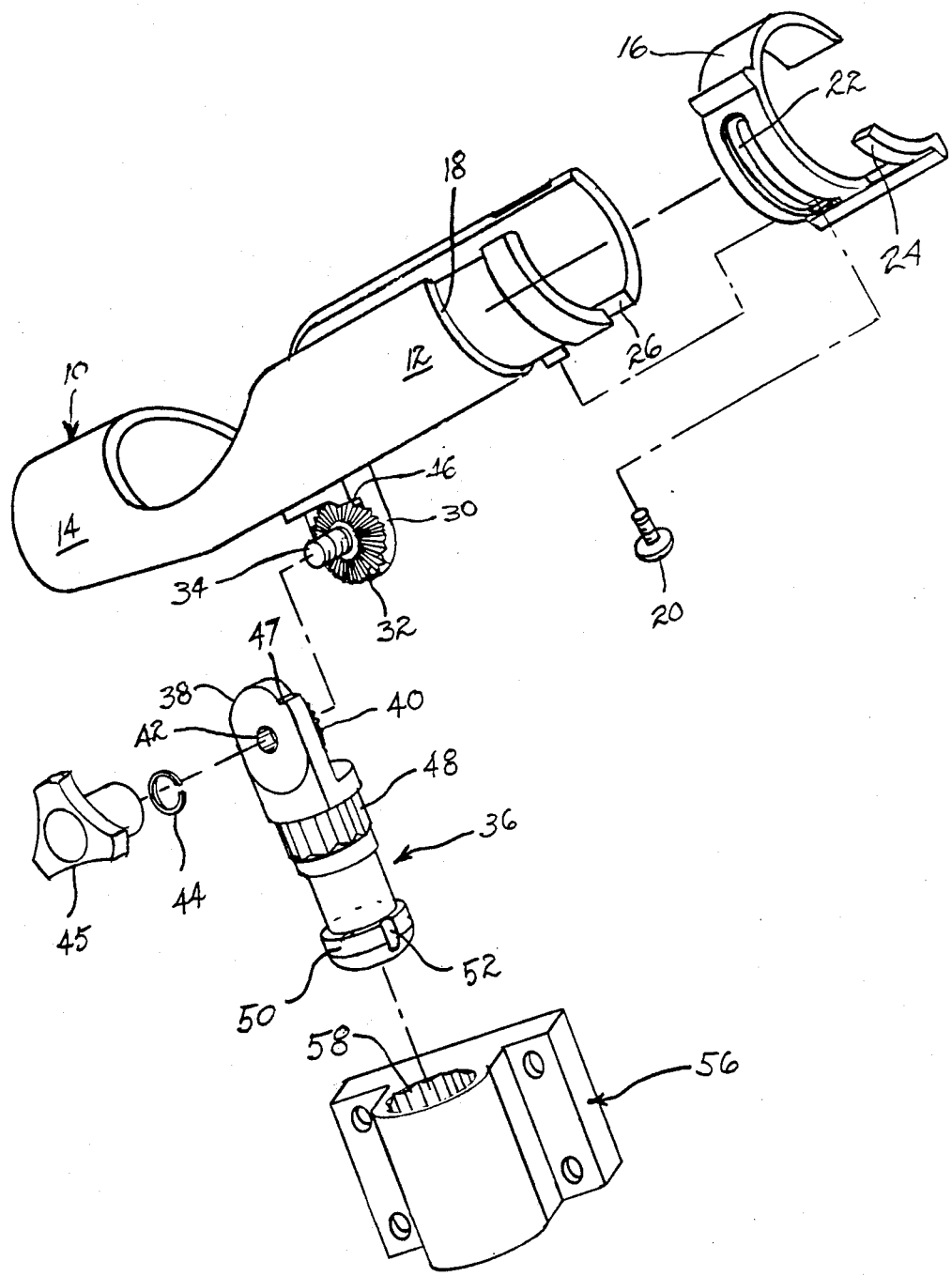
FIG.—1

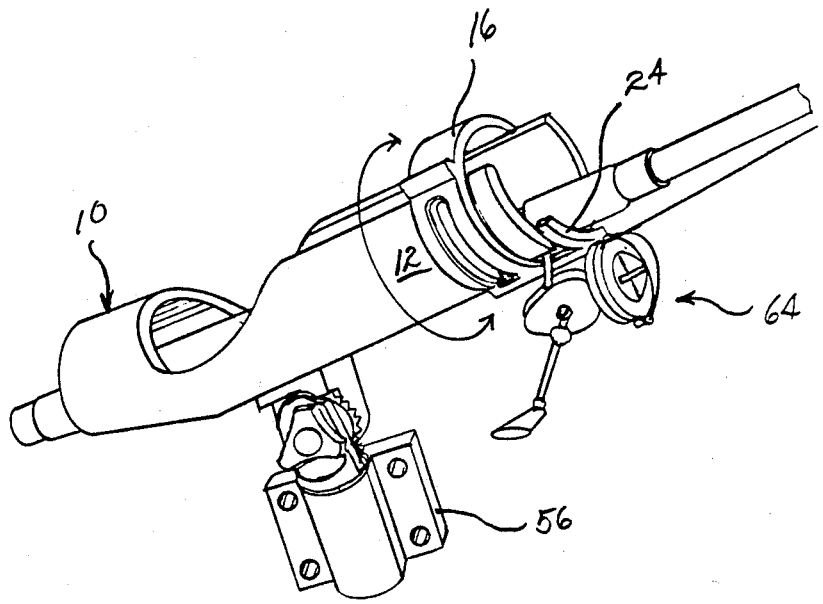
FIG. — 2
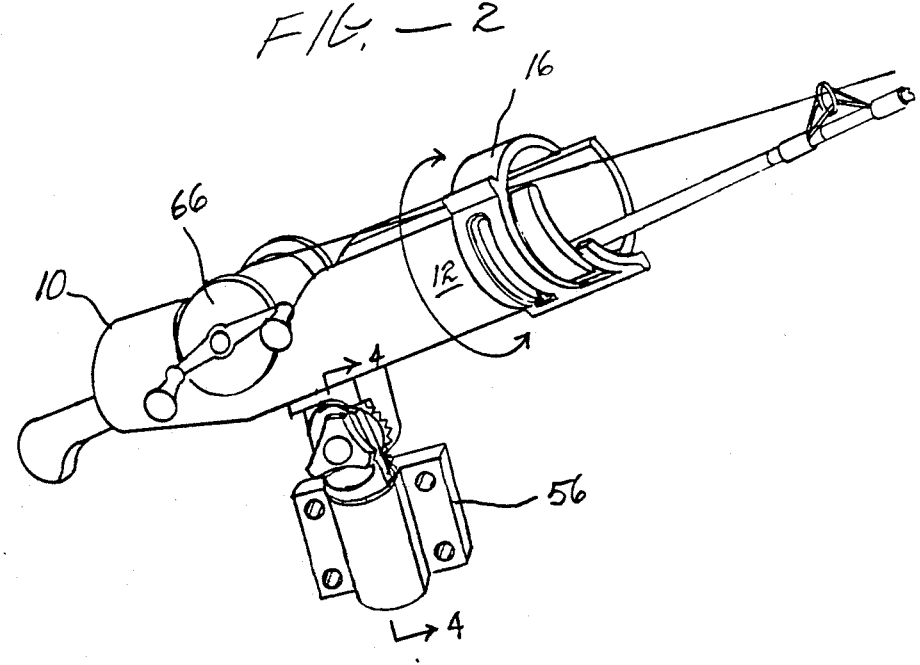
FIG. — 3

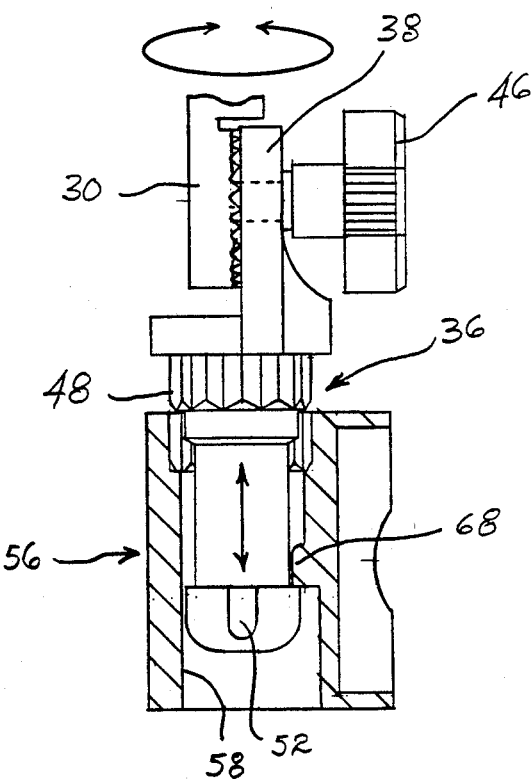
FIG.—4

FISHING ROD HOLDER FOR CASTING AND SPINNING REELS

BACKGROUND OF THE INVENTION

This invention relates generally to fishing equipment, and more particularly the invention relates to an improved holder for a rod and reel.

My U.S. Pat. No. 4,641,453 discloses a fishing rod holder having an integral alarm and mounting structure. The rod holder portion includes a holster which readily accommodates both rods with conventional casting reels and rods with spinning reels. More particularly, the holster includes a first cylindrical portion having an open side for supporting a rod and a second cylindrical portion having an open side for engaging a handle of the rod, the first and second cylindrical portions being integral with the open sides of the first and second cylindrical portions being axially displaced by 180°.

A strap is positioned for retaining a conventional rod and reel in the holster portion with the reel positioned above the holster. The strap can also be positioned to hold a rod and spinning reel in the holster portion where the spinning reel is outside of and below the holster.

The disclosed rod holder is an improvement over other commercially available rod holders such as the Fish-On TM rod holder manufactured by Tempress Company of Seattle, Wash. The Tempress rod holder has a similar holster with a rigid clamp rotatably mounted on an end of the holster to retain a conventional rod and reel in the holster where the rod sits above the holster. However, the rod holder will not accommodate a rod with spinning reel where the reel depends from the rod outside of and below the holster.

SUMMARY OF THE INVENTION

An object of the present invention is an improved fishing rod holder for rods with either casting or spinning reels.

A feature of the invention is a rod holder having a holster portion with a rigid clamp rotatably mounted on one end thereof which can lock both a conventional reel and a spinning reel.

Another feature of the invention is a rod holder including a pivotal mounting structure having stop members for limiting the forward pivot of the rod holder.

Briefly, the clamp used in the rod holder of the present invention comprises a rigid clamp rotatably mounted on one end of the rod support holster which can be rotated to one position for receiving or releasing a rod from the holster and which can be rotated to another position for locking either a conventional rod and reel in the holster or a rod with spinning reel in the holster. The clamp includes an integral appendage below and spaced from the holster for locking a spinning reel depending from a rod in the holster.

The rod holder is rotatably affixed to a support post with an ear extending from the rod holder bolted to an ear extending from the post. The ears have complementary undulating surfaces which engage to define the angle of inclination of the rod holder. The ears have shoulders which limit the forward pivot of the rod holder when the undulating surfaces are not engaged and the rod holder is rotatable on the support post.

The invention and objects and features thereof will be more readily apparent from the following detailed description and appended claims when taken with the drawing.

BRIEF DESCRIPTION OF THE DRAWING

FIG. 1 is an exploded perspective view of the fishing rod holder in accordance with one embodiment of the invention.

FIG. 2 is an isometric view illustrating the fishing rod holder of FIG. 1 supporting a spinning reel.

FIG. 3 is an isometric view of the assembled fishing rod holder of FIG. 1 supporting a conventional casting reel.

FIG. 4 is a section view of the mount for supporting the fishing rod holder of FIG. 1.

DETAILED DESCRIPTION OF ILLUSTRATIVE EMBODIMENT

Referring now to the drawing, FIG. 1 is an exploded perspective view of one embodiment of the invention. The fishing rod holder comprises a holster 10 for supporting the fishing rod and reel. Holster 10 includes a first cylindrical portion 12 having an open side for supporting a rod, and a second cylindrical portion 14 having an open side for engaging the handle of the rod, the first and second cylindrical portions being integral with the open sides of the first and second cylindrical portions being axially displaced by 180°. A rigid clamp 16 is rotatably positioned in a recess 18 in the holster 10 with a screw 20 engaging the holster 10 and riding in a slot 22 in the clamp 16.

In accordance with one feature of the invention, the clamp 16 includes an integral appendage 24 extending outwardly from one side for retaining a spinning rod in the holster as will be described with reference to FIG. 2. A notch 26 is provided in one end of the holster 10 to accommodate a spinning reel, as is illustrated in FIG. 2.

Extending from holster 10 is a bracket or ear 30 integral with the holster 10, with a bolt 34 extending through the ear and surrounded by an undulating surface 32. A post 36 includes an ear 38 having an undulating surface 40 which mates with the undulating surface 32. Bolt 34 extends through a hole 42 in ear 38, and the ears 30 and 38 are maintained in a locked position by means of lock washer 44 and knob 45 which engages bolt 34. It will be appreciated that the angle of inclination of the holster 10 with respect to the post 36 is established by the relative positions of the undulating surfaces 32 and 40. In accordance with another feature of the invention, shoulders 46 and 47 on ears 30 and 38, respectively, limit the forward pivot of the rod holder on the post 36 when bolt 34 is loosened and the undulating surfaces 32 and 40 are not engaged whereby the holster 10 is rotatable on the support post 36.

Post 36 further includes an undulating surface 48 about a limited portion of the outer surface of the post, and an enlarged end portion 50 having a slot 52 therein. Post 36 is supported by a mount 56 which is permanently attached to a support structure, with the post 36 being inserted into a barrel 58 in the mount 56. Barrel 58 has an undulating interior surface which mates with the undulating surface 48 of post 36.

FIG. 2 is an isometric view of the assembled fishing rod holder with a spinning reel 64 positioned in the holster 10. Clamp 16 is rotated about the opening in the first cylindrical portion 12 of the holster with the appendage 24 in juxtaposition with one end of the first cylindrical portion 12 and locking the spinning reel 64 to the holster 10.

FIG. 3 is an isometric view of the assembled fishing rod holder with a conventional casting reel 66 supported in the holster 10. Again, the clamp 16 is rotated across the opening in the first cylindrical portion 12, thereby preventing a fish from pulling the rod and reel from the holster 10.

FIG. 4 is a section view of the mount 56 with the post 36 partially inserted therein. In this view, the post 36 is not fully inserted and the undulating surface 46 thereof does not engage the undulating surface of the barrel 58. The interior surface of the barrel 58 includes a protrusion 68 which mates with slot 52 in the enlarged end portion 50 of the post, whereby the post can be inserted into the barrel only when the slot 52 is aligned with the protrusion 68. Once the post 36 is inserted, the protrusion 68 engages the enlarged end portion 50 and prevents the post from being removed from the barrel 58 unless the slot 52 is aligned with protrusion 68. Thus, the holster can be rotated horizontally to different positions by withdrawing the undulating portion 48 from the undulating portions of the barrel, but the protrusion 68 engages the enlarged portion 50 of the post to prevent the post and holster from being totally removed from the mount by accident with the possible loss of the rod, reel, and holster.

There has been described an improved fishing rod holder for accommodating both casting and spinning reels. The rod holder can be rotated both horizontally and vertically with the forward tilt of the rod holder being limited. The cooperative arrangement of the mount and support post received thereby permits horizontal rotation of the holster portion while the holster and post are maintained in engagement with the mount.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

I claim:

1. A fishing rod holder comprising
   a holster for receiving a rod,
   a rigid clamp rotatably mounted on an end portion of said holster for locking a rod and reel in said holster portion, and
   an appendage extending from said rigid clamp and integral therewith, said appendage extending forward of said clamp and said holster and being rotatable into juxtaposition with an edge of said one end portion of said holster thereby locking in said holster a rod and spinning reel depending from said rod outside of said holster.

2. The fishing rod holder as defined by claim 1 and further including a support post rotatably attached to said holster, a mount attachable to a base structure, said mount including a barrel portion for receiving said support post.

3. The fishing rod holder as defined by claim 2 and further including a first ear extending from said holster, a second ear on said support post, and means for fastening said first and second ears.

4. The fishing rod holder as defined by claim 3 wherein said first ear has an undulating surface, said second ear has an undulating surface, said means for fastening engaging said undulating surfaces.

5. The fishing rod holder as defined by claim 4 wherein said first ear includes a shoulder, said second ear includes a shoulder, said first and second shoulders limiting the forward tilt of said holster when said undulating surfaces are not engaged and said holster is rotatable on said support post.

6. The fishing rod holder as defined by claim 5 wherein said post includes an undulating outer surface near one end thereof, said barrel portion having a complementary undulating inner surface for receiving said undulating outer surface when said post is fully inserted into said barrel portion.

7. The fishing rod holder as defined by claim 6 wherein said post includes an enlarged end portion on the opposite end thereof with a slot in the outer surface of said enlarged end portion, said barrel including a protrusion in its inner surface for receiving said protrusion.

* * * * *